United States Patent [19]
David et al.

[11] Patent Number: 4,567,101
[45] Date of Patent: Jan. 28, 1986

[54] FERRIMAGNETIC SPINEL FIBERS

[75] Inventors: Lawrence D. David, Florham Park; Richard M. Arons, Chatham, both of N.J.

[73] Assignee: Celanese Corporation, New York, N.Y.

[21] Appl. No.: 654,474

[22] Filed: Sep. 26, 1984

Related U.S. Application Data

[62] Division of Ser. No. 487,400, Apr. 21, 1983, Pat. No. 4,485,085.

[51] Int. Cl.$^4$ ............................................. D02G 3/00
[52] U.S. Cl. .................................... 428/364; 428/372; 423/594
[58] Field of Search ................ 428/364, 359; 423/594; 252/62.62, 62.56; 264/63; 501/35, 36, 95, 10

[56] References Cited

U.S. PATENT DOCUMENTS 3,849,545 12/1954 Miklas ................................. 423/594
3,962,514 6/1976 Rittler .................................... 501/10

FOREIGN PATENT DOCUMENTS 1253807 11/1971 United Kingdom ................ 423/594

Primary Examiner—Lorraine T. Kendell
Attorney, Agent, or Firm—Depaoli & O'Brien

[57] ABSTRACT

This invention provides a process for the preparation of ferrimagnetic spinel fibers composed of crystallites corresponding to the formula:

$$M_1Fe_2O_4$$

where M is a divalent metal such as manganese, iron, cobalt, nickel, copper, zinc, cadmium, magnesium, barium, strontium, or any combination thereof.

3 Claims, No Drawings

FERRIMAGNETIC SPINEL FIBERS

This is a division, of application Ser. No. 487,400 filed Apr. 21, 1983, now U.S. Pat. No. 4,485,085.

BACKGROUND OF THE INVENTION

In recent years inorganic fibers have received increasing attention. Such interest may be traced at least in part to new demands of industry for fibers capable of withstanding elevated temperatures without deleterious effects. The growing aerospace industry provides many applications for light and strong heat resistant fibrous materials. Inorganic refractory fibers commonly available today in commercial quantities include graphite, alumina-silica, and silicon carbide.

The formation of inorganic refractory fibers has required elaborate and time-consuming procedures since such compounds possess high melting points which render meltspinning either impossible or extremely difficult. Procedures for the thermal formation of fibrous graphite have been proposed in which continuous cellulosic fibers or woven textile articles formed therefrom serve as the starting material. Also, generally infusible synthetic polymeric fibers, such as those formed from acrylonitrile or copolymers thereof, have served as starting materials in processes proposed for the production of fibrous graphite.

U.S. Pat. Nos. 3,270,109 and 3,271,173 disclose processes for the production of inorganic oxide monofilaments in which a precursor fiber composed of certain inorganic or metallorganic salts is formed and then heated to convert the same to the desired inorganic filament. Additionally, inorganic fibers such as those formed from boron or boron carbide have been prepared by the vapor deposition of the same upon a substrate, such as fine tungsten wire.

Other U.S. patents which specifically relate to production of inorganic fibers include U.S. Pat. Nos. 3,107,152; 3,116,975; 3,179,605; 3,270,109; 3,271,173; 3,285,696; 3,311,689; 3,385,915; 3,529,044; 3,760,049; 4,008,299; and 4,126,652.

Inorganic fibers also are finding new applications in the growing electronics industry. There is interest in ceramic fibers which exhibit magnetic anisotropy and high electrical resistivity.

U.S. Pat. No. 2,968,622 describes a process for the preparation of magnetic ceramic fibers which involves attenuation of a molten magnetic material into a fine filament having a mechanically oriented atomic distribution, and followed by rapid chilling thereof to freeze the oriented atomic distribution Magnetic ceramic fibers have a wide range of adaptability for prospective applications such as the production of transformers, inductors, switching elements, memory devices, recording heads, tapes, electromagnetic interaction shields, and the like.

There remains a need for new and improved processes for the production of inorganic fibers. There is further need for novel ceramic fibers which can meet high performance specifications under exceptional operating conditions.

Accordingly, it is an object of this invention to provide an improved process for the production of inorganic fibers.

It is another object of this invention to provide a process for the production of ferrimagnetic spinel fibers.

It is a further object of this invention to provide novel ferrimagnetic spinel fibers.

Other objects and advantages of the present invention shall become apparent from the accompanying description and example.

DESCRIPTION OF THE INVENTION

One or more objects of the present invention are accomplished by the provision of a process for the production of ferrimagnetic spinel fibers which comprises (1) forming an aqueous solution containing metal salt compounds in quantities and with metal valences that subsequently yield a spinel product corresponding to the formula:

$$M_1Fe_2O_4$$

where M is a divalent metal ion such as manganese, iron, cobalt, nickel, copper, zinc, cadmium, magnesium, barium, strontium, or any combination thereof; (2) contacting the aqueous solution with organic polymer fibers that swell and are imbibed with the metal salts; (3) contacting the imbibed fibers with an alkaline aqueous solution to precipitate the metal salt content of the fibers in the form of metal hydroxides; and (4) pyrolyzing the fibers at a temperature between about 500°–2500° C. in the presence of molecular oxygen to form ferrimagnetic $M_1Fe_2O_4$ spinel fibers.

The plus two valence metal (M) compounds preferably are in the form of mineral acid salts such as chlorides, bromides, sulfates, nitrates, and phosphates. The solubility of the metal salt compounds is increased if the aqueous solution in step (1) has a pH in the acidic range, e.g., by the addition of a mineral acid.

The concentration of the metal salt cations in the step (1) aqueous solution can vary in the range between about 2–30 weight percent, based on total solution weight. The maximum concentration achievable depends on factors such as the solubility of the respective metal salt compounds, the temperature, the pH of the solution, and the like.

Among the preferred mixtures of metal salt compounds is a combination of nickel, zinc, and iron compounds, which subsequently will provide a ferrimagnetic spinel $M_1Fe_2O_4$ product in which the gram-atom ratio of nickel/zinc/iron is about 0.7:0.3:2.

In step (2) of the process, organic polymer fibers are contacted with the aqueous solution formed in step (1), e.g., by submersion of the fibers in the aqueous solution. Once contact has been established, the fibers swell in size by absorption of the water solution and its metal salt solute.

It is essential that a sufficient content of metal salt compounds is imbibed in the swollen fibers, in order to provide adequate strength in the final ferrimagnetic spinel fiber product. The content of the metal salts in the imbibed fibers should be at least 0.1 gram per gram of organic polymer, and preferably the content is in the range between about 0.2–2 grams of metal salts per gram of organic polymer.

Optionally, the fiber can be pre-swelled with water and/or a water-soluble organic solvent prior to the immersion in the imbibing aqueous solution in step (1).

The optimal contact time of the fibers with the imbibing solution in step (1) at 15°–45° C. will vary between about 10 seconds and 2 hours, depending on various factors such as the metal salt concentration in the imbibing solution, the particular metal salts involved, the type of fiber, whether or not pre-swelling is employed, and the like.

The organic polymer fibers employed in step (2) can be any of a broad variety of available types of polymer fibers with the proviso that the selected fibers must be capable of swelling and absorbing the step (1) aqueous solution, and further that the fibers do not melt when heated.

Suitable types of fibers are those composed of natural or synthetic polymers such as cellulosics (e.g., cotton or rayon), wool, silk, polyacrylics (e.g., polyacrylonitrile), polyesters (e.g., polyethylene terephthalate), polyamides (e.g., nylon 6,6), polyurethanes, polyimidazoles, and the like.

After the imbibed fibers are recovered from the step (2) procedure, they are contacted with an alkaline aqueous solution in step (3) to convert the imbibed metal salt compounds to the corresponding metal hydroxides which precipitate out of solution within the fiber internal structure.

In a typical operation, the fibers are submerged in an aqueous bath which has a pH above about 8.5 for a period of time sufficient to achieve the precipitation of metal hydroxides inside the fiber substrate. The contact period of the fibers with the alkaline aqueous medium will vary in the range between about 0.1-1 hour, i.e., until the precipitation of metal hydroxides is completed.

Suitable basic reagents for providing alkalinity in the aqueous medium include alkali metal hydroxides such as sodium hydroxide and potassium hydroxide, and other basic reagents such as alkali metal carbonates and phosphates.

After the alkaline medium treatment of the fibers has been completed, it is desirable to remove the residual alkaline solution which adheres to the surfaces of the fibers, so as to prevent bonding together of fibers by caked salt. The excess alkaline solution can be removed by washing the fibers with water, by blotting with absorbent paper or cloth, by centrifugation or vacuum filtration, or by various combinations of these methods.

Preferably the fibers are then thoroughly dried, such as by air drying or by exposing the fibers to a stream of warm gas.

The pyrolysis step of the process is conducted at a temperature between about 600°–1800° C. in the presence of molecular oxygen for a period between about 0.3–5 hours sufficient to provide ferrimagnetic spinel fibers substantially free of carbon content.

In one embodiment, the present invention provides ferrimagnetic spinel fibers comprising crystallites corresponding to the formula:

$$M_1Fe_2O_4$$

where M is divalent metal; and wherein the average size of the ferrite particles is less than about 1000 Angstroms.

In a more particular embodiment, the present invention provides ferrimagnetic spinel fibers comprising crystallites corresponding to the formula:

$$M_1Fe_2O_4$$

where M is manganese, iron, cobalt, nickel, copper, zinc, cadmium, magnesium, barium, strontium, or any combination thereof; and wherein the average size of the ferrite particles is less than about 1000 Angstroms.

Under optimal conditions, the practice of the present invention provides ferrimagnetic spinel fibers which are strong and flexible. When woven into the form of a fabric, the ferrimagnetic spinel fiber product is particularly suitable for electromagnetic interaction shielding.

The following Example is further illustrative of the present invention. The specific ingredients and processing parameters are presented as being typical, and various modifications can be derived in view of the foregoing disclosure within the scope of the invention.

EXAMPLE

A.

A 320 gram quantity of polyacrylonitrile polymer (PAN, number average molecular weight of 100,000) is dissolved in 1680 grams of dimethylacetamide (DMAC) solvent to yield a 16% by weight dope of PAN/DMAC.

The spin bath employed for coagulation during fiber formation is a 70/30 by volume mixture of methanol and dimethylacetamide.

B.

A metal chloride dip bath is prepared by mixing the following:

| | | |
|---|---|---|
| 1572 g | FeCl$_3$.6H$_2$O | (Fisher, lump grade) |
| 483 g | NiCl$_2$.6H$_2$O | (Fisher) |
| 120 g | ZnCl$_2$ | (MCB) |
| 600 g (500 ml) | concentrated HCl | (12 molar) |

The mixture is diluted to 4 liters with distilled water, and stirred until all the solids are dissolved to form a dark brown solution.

The solution contains the following metal ion content:

| | | |
|---|---|---|
| [Fe$^{3+}$]:1.454 M, | 6.44% | |
| [Ni$^{2+}$]:0.508 M, | 2.37% | |
| [Zn$^{2+}$]:0.220 M, | 1.14% | |
| | 9.95% | by weight |

[Fe$^{3+}$]/[Ni$^{2+}$]/[Zn$^{2+}$] = 2.000/0.699/0.303

C.

An aqueous alkaline solution is prepared by diluting 323.6 g of 50/50 aqueous NaOH stock solution to two liters with distilled water.

The alkaline solution has an [OH$^-$] content of 2.02 M, and a pH of about 14.

D.

The PAN dope is extruded from a spinning jet and is coagulated in the spin bath (70/30 methanol/DMAC). The formed fiber is passed over rollers and into the metal chloride bath. The immersion time is controlled by raising or lowering a teflon dip stick. In this bath, the PAN fiber swells and is imbibed with the metal chlorides, turning the fiber orange-red.

The fiber is passed into the aqueous sodium hydroxide solution, which causes the precipitation of rust-red metal hydroxides in the fiber. The fiber is passed through a distilled water bath to wash off any sodium chloride product, then over a series of skewed rollers to draw and stretch it. One roller is immersed in a water bath to wash out any residual sodium chloride from the fibers. The resultant red fiber product is picked up on a bobbin. Elemental analysis of this fiber indicates that it is 9.7% by weight iron, 2.7% nickel, and 2.0% zinc. Only 71 ppm of sodium and 110 ppm of chlorine are present, confirming that the fiber washing steps are effective in removing these impurities.

The fiber is then stabilized by heating in air at 265° C. The resultant black fiber is pyrolyzed at 600° C. in air, then at 1200° C. in oxygen, to yield a black ferrimagnetic fiber. X-ray diffraction analysis indicates that this fiber consists of $\alpha\text{-Fe}_2\text{O}_3$ and spinel ($M_1Fe_2O_4$) in approximately equivalent amounts. The average particle size in the fibers, as determined by scanning electron microscope measurements, is less than about 1000 Angstroms.

What is claimed is:

1. Ferrimagnetic spinel fibers comprising ferrite particles corresponding to the formula:

$$M_1Fe_2O_4$$

where M is manganese, iron, cobalt, nickel, copper, zinc, cadmium, magnesium, barium, strontium, or any combination thereof; and wherein the average size of the ferrite particles is less than about 1000 Angstroms.

2. Ferrimagnetic spinel fibers in accordance with claim 1 wherein M is nickel, zinc, or a combination thereof.

3. Ferrimagnetic spinel fibers in accordance with claim 2 wherein the gram-atom ratio of nickel/zinc/iron is about 0.7:0.3:2.